Patented Nov. 4, 1924.

1,514,249

UNITED STATES PATENT OFFICE.

WILLIAM H. BOSER AND FREDERICK J. BOSER, OF MINNEAPOLIS, MINNESOTA.

MATERIAL FOR MAKING PRINTERS' ROLLERS AND PROCESS OF PRODUCING THE SAME.

No Drawing.    Application filed October 11, 1923. Serial No. 667,890.

*To all whom it may concern:*

Be it known that we, WILLIAM H. BOSER and FREDERICK J. BOSER, citizens of the United States, residing at Minneapolis, in the county of Hennepin and State of Minnesota, have invented certain new and useful Improvements in Materials for Making Printers' Rollers and Processes of Producing the Same; and we do hereby declare the following to be a full, clear, and exact description of the invention, such as will enable others skilled in the art to which it appertains to make and use the same.

Our invention provides an improved product or article of manufacture especially adapted for use in making printers' rollers and involves also an improved process of producing the same. Generally stated, the invention consists of the novel composition of elements and of the novel steps of manipulation hereinafter described and defined in the claims.

The nature of the product will appear from the description of the process by which it is made.

In producing this improved roller-forming composition, we mix together two solutions, which, for convenience, we will designate as solution A and solution B. Solution A is preferably composed of water, glue, glycerine, borax, varnish, and castor oil, in approximately the following proportions, towit: water one-half pound, glue one pound, glycerine one pound, borax one ounce, varnish one ounce, castor oil one ounce.

Solution B will preferably be composed of chromium sulphide, molasses, oxide of iron, and sulphur, in approximately the following proportions, towit: chromium sulphide one-fourth ounce, molasses one-fourth ounce, oxide of iron one-fourth ounce, and sulphur one-fourth ounce. Solutions A and B, while quite hot, preferably near the boiling point, will be thoroughly stirred together and commingled, and they will almost immediately form, even when hot, a very heavy or sort of semi-liquid composition, which is capable of being easily shaped into the form of rollers, or other form, for that matter, by the use of molds. The molded material, in forty-eight hours or less, will take on a tough but elastic rubber-like condition that will be moisture-resistant or impervious to moisture and very suitable for use in making printers' rollers. The oxide of iron used is preferably a magnetic oxide of iron.

In actual practice, printers' rollers of exceedingly high efficiency have been commercially made at reasonably low cost. Rollers made as above described have the following desirable characteristics, towit: The roller is so firm that it is impervious to changes of weather; it is tacky enough to clean out the form thoroughly; it is so durable that it will not melt from heat occasioned by friction and speed of press; it requires very little or no setting of rollers; the job can be printed with less ink than the old formula roller; the press can be run steadily at the highest rate of speed and without any stopping; and the highest grade of printing can be done with these rollers.

What we claim is:

1. A new composition of matter comprising glue dissolved in water and glycerine and commingled with chromium sulphide, sulphur, and oxide of iron.

2. A new composition of matter shaped to form a printer's roller and comprising glue dissolved in water and glycerine and commingled with chromium sulphide, molasses, oxide of iron, and sulphur.

3. A new composition of matter shaped to form a printer's roller and composed of the following ingredients in approximately the proportions stated, towit: water one-half pound, glue one pound, glycerine one pound, varnish one ounce, castor oil one ounce, chromium sulphide one-fourth ounce, molasses one-fourth ounce, oxide of iron one-fourth ounce, and sulphur one-fourth ounce.

4. The process of producing a composition of matter suitable for making printers' rollers which consists of treating a mixture of glue dissolved in water and glycerine with a composition containing chromium sulphide, sulphur and oxide of iron.

5. The process of producing a composition of matter suitable for making printers' rollers which consists of treating a mixture of glue dissolved in water and glycerine with a composition containing chromium sulphide, sulphur and oxide of iron, while at a temperature approaching the boiling point.

6. The process of producing a composition of matter suitable for making printers' rollers, which consists in commingling two compositions, the first of which is composed of water, glue, glycerine, varnish and castor oil, and the second of which is composed of chromium sulphide, molasses, oxide of iron and sulphur.

7. The process of producing a composition of matter suitable for making printers' rollers, which consists in commingling two compositions, the first of which is composed of water, glue, glycerine, varnish and castor oil, and the second of which is composed of chromium sulphide, molasses, oxide of iron and sulphur, while at a temperature approaching the boiling point.

8. The process of producing a composition of matter suitable for making printers' rollers, which consists in commingling two compositions, the first of which is composed of water, glue, glycerine, borax, varnish and castor oil, and the second of which is composed of chromium sulphide, molasses, oxide of iron and sulphur, the said ingredients being in approximately the following proportions, towit: water one-half pound, glue one pound, glycerine one pound, borax one ounce, varnish one ounce, castor oil one ounce, chromium sulphide one-fourth ounce, molasses one-fourth ounce, oxide of iron one-fourth ounce, and sulphur one-fourth ounce.

9. A new composition of matter shaped to form a printer's roller and composed of the following ingredients in approximately the proportions stated, towit: water one-half pound, glue one pound, glycerine one pound, borax one ounce, varnish one ounce, castor oil one ounce, chromium sulphide one-fourth ounce, molasses one-fourth ounce, oxide of iron one-fourth ounce, and sulphur one-fourth ounce.

In testimony whereof we affix our signatures.

WILLIAM H. BOSER.
FREDERICK J. BOSER.